Patented Feb. 8, 1927.

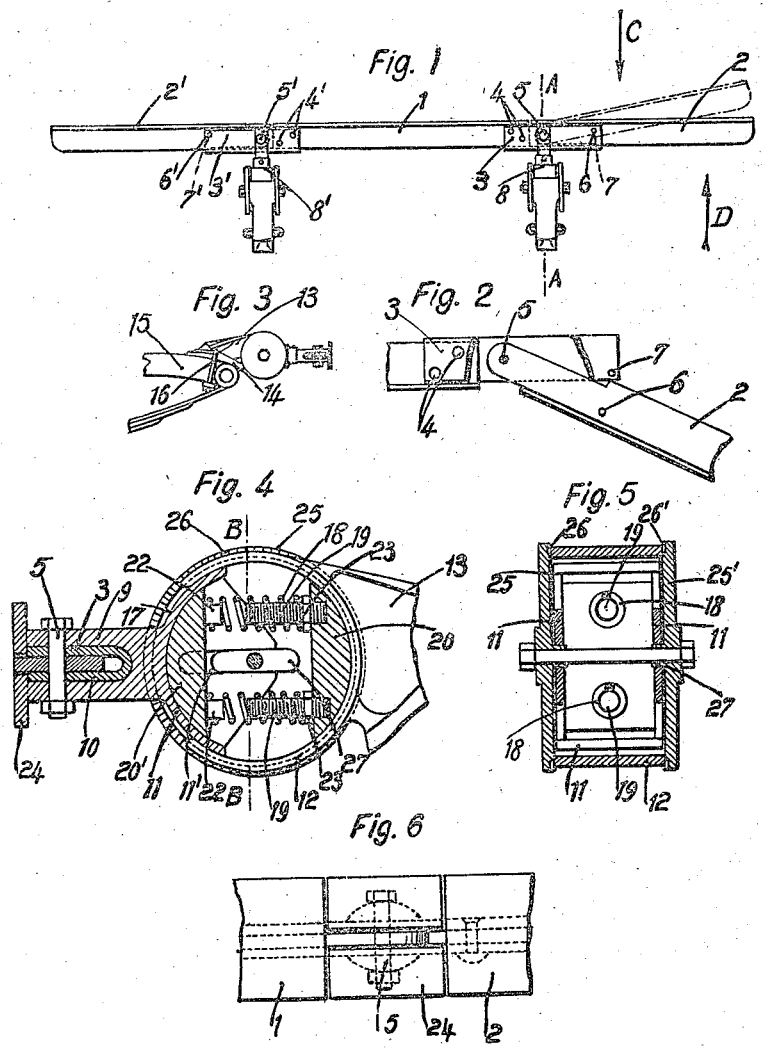

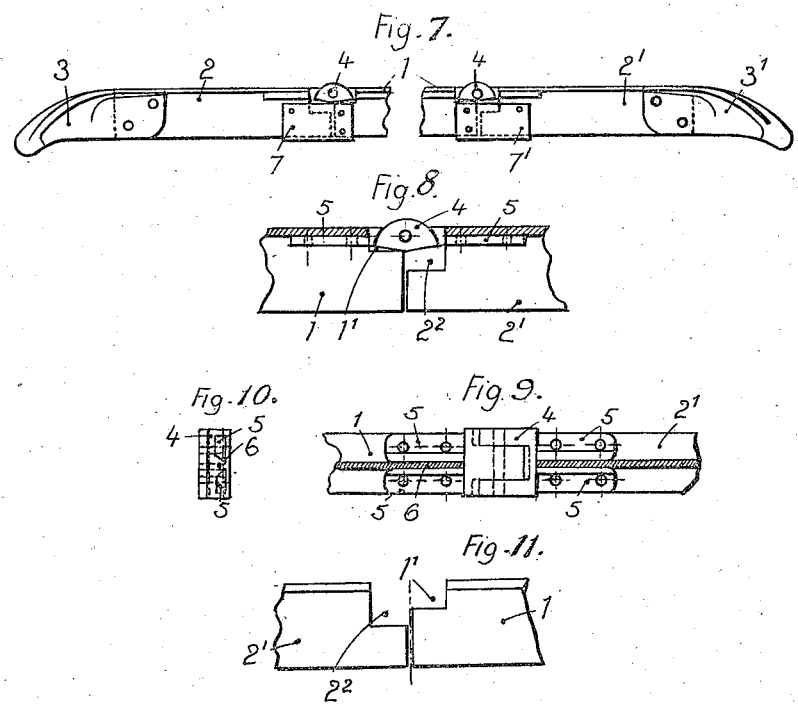

1,616,504

UNITED STATES PATENT OFFICE.

MARCEL CHARLES ERNEST MULOT, OF PARIS, FRANCE.

SHOCK-ABSORBING DEVICE FOR VEHICLES.

Application filed September 14, 1925, Serial No. 56,358, and in France September 19, 1924.

My invention relates to improvements in shock-absorbing devices for vehicles, wherein the end portions of the shock-absorbing bar are pivoted to the central portion of the said bar, in such manner that the said end portions will readily yield to shocks occurring in the contrary direction to those which the said bar is designed to receive. I thus obviate the drawbacks inherent in the known shock-absorbing or protecting devices wherein the ends of the device are readily caught by another vehicle, where a front bar is used, or will catch upon vehicle, in the case of a rear bar.

The bar device as a whole is rigidly maintained by suitable stop-pieces, in order to withstand the shocks which are brought upon the said bar in the usual conditions.

My said improvements further relate to a method of mounting the shock-absorbing bar upon the vehicle frame, the arrangement being so designed that the said bar can be readily fitted to all vehicles without any complicated preliminary adjustment. The said bar is mounted upon pivoting supports in such manner that the proper height and position of the bar may be readily adjusted. The said supports comprise two different elements, first a shell which is secured to the bar and comprises suitable spring damping means, and secondly an outer sleeve secured to an attaching device for securing the same to the front frame members of the vehicle, for instance. The said shell is disposed within the said sleeve and it may be secured in the proper angular position within the sleeve in order to assure the suitable adjustment of the bar by the pressure of two disks bearing upon the respective sides of the said sleeve and shell.

The invention further comprises certain detail dispositions which will be hereinafter set forth.

In the appended drawings:

Fig. 1 is a plan view of the bar and its supports.

Fig. 2 shows on a larger scale an end part of the bar, pivoted to the middle part.

Fig. 3 is a side view of the bar mounted on the front frame members of the vehicle.

Fig. 4 is a section on the line A—A of Fig. 1, showing details of the movable support and the damping device.

Fig. 5 is a section on the line B—B of Fig. 4.

Fig. 6 is a front view of the bar at the junction of an end part to the central part.

Figs. 7 to 11 inclusive show a modification of the pivoting of the ends of the shock-absorbing bar upon the central part.

Referring to the drawing, it will be observed that the shock-absorbing bar consists of a central portion 1 and two end portions 2 and $2^1$. At the point of junction between the central portion and the said end portions are disposed the gussets, 3 and $3^1$ consisting of metal plates bent into shape which are secured for instance by the rivets 4, $4^1$ to the middle part of the said bar. The end portions 2 and $2^1$ are mounted in the interior of the said gussets by means of the pivot axles 5, $5^1$.

Means for retaining the end portions 2, $2^1$ within the said gussets are provided by the use of the projections 6 and $6^1$ which are mounted on the said end portions and cooperate with the apertures 7, $7^1$ formed in one of the flanges of the said gussets, so that the end portions 2—$2^1$ can be maintained in engagement with the said gussets and hence in line with the middle portion 1. The gusset plates are sufficiently elastic to permit the pins or projections 6, $6^1$ to slide over the inner face of the gusset plate until the pins or projections reach the aperture in the gusset plates, when the gusset plates will automatically engage the aperture and lock the pivoted arm to the central portion of the bar. In normal operation, when the bar acts as a shock protector, it will be observed that for all shocks acting upon the bar in the direction of the arrow C, the said bar will be quite rigid, and the ends 2, $2^1$ will rest upon the back part of the said gussets. But in the case of shocks acting in the direction of the arrow D, the ends 2, $2^1$ are enabled to pivot upon the axles 5, $5^1$ so as to assume an angular displacement. When the device is mounted upon the front frame members of the vehicle, the end 2, when subjected to a shock caused by another vehicle, may be brought into the position shown in the dot and dash lines of Fig. 1.

Obviously, the same type of protecting bar may be employed at the front and at the rear of the vehicle, without any other modification than for the means for securing it to the vehicle frame. The said protecting bar as a whole is mounted upon the two supports 8 and $8^1$, which as shown in detail in Fig. 4 comprise the rod 9 which is slotted at 10 so as to afford connection with the said gussets 3 and 3¹ by means of bolts, for instance, said rod being cast integral with a shell 11 cooperating with the partially formed sleeve 12 which is cast integral with a member 13 serving to secure it to the vehicle frame.

In the constructional form which is shown by way of example, the member 13 forms a base plate 14 (Fig. 3) which bears upon the frame members of the front springs 15 and is secured to the said frame members by means of a strap 16. In the walls of the sleeve 12 is formed a recess or aperture 17 enabling the shell 11 to pivot through a given angle within the said sleeve in order to suitably regulate the height of the bar. The shell 11 is held in the proper position within the sleeve 12 by the pressure of the disks 25, 25¹—preferably having the lateral teeth 26 and 26¹—which bear against the lateral faces of the shell 11 and of the said sleeve when the device is tightened by the bolt and nut connecting the disks 25, 25¹. The keys 27 which are cast integral with the internal faces of the said disks are adapted to engage in slots formed in the sides of the shell 11.

The shock protecting device properly so called is disposed in the supports 8, 8¹, and comprises the springs 18 which are for instance two in number, said springs being mounted at one end upon the screwthreaded studs 19 which are screwed into a member 20, loosely mounted within the sleeve 12. The other end of the said springs engages the studs 22 mounted in a member 20¹, resembling the member 20, which is loosely mounted in the shell 11; the nuts 23 on the studs 19 can be set upon the latter in order to regulate the tension of the springs 18 of the shock-absorbing device.

It will be noted that in the constructional form herein represented by way of example, the protecting bar consists of a T iron member, whose flanges are placed at the front in order to receive the shocks in the perpendicular direction; in this case, the flanges of the T are cut off for a certain length of the bar at its points of junction of the end portions of the bar with the central portion. To conceal the resulting space in the flanges, which would lead to an unattractive appearance of the device, the space is filled up by a plate 24 which is cast integral with the arms 9 and the shell 11, and whereof the edges adjacent the flanges of the bar are beveled to allow the motion of the ends of the bar. The edges of the flanges have a like disposition.

The operation is very simply carried out as follows:

To mount the device in position, the sleeves 12 are disposed upon the front frame members or upon a suitable part at the rear of the vehicle frame, and the height of the bar is adjusted by placing the shells 11 in a suitable position in the sleeves 12. When the bar receives shocks in the perpendicular direction, the arms 9 will move within the sleeves 12, thus compressing the damping springs 18 whose tension is adjustable as above stated.

Should one end of the said bar be caught by a vehicle which overtakes the vehicle provided with the bar, this end will move forward, and there will be no damage to either vehicle; the same will be true when the vehicle provided with the bar catches another vehicle by means of the rear bar, for the end of the said bar will now move to the rear.

In Figs. 7 to 11, the shock-absorbing bar comprises, as before, the central part 1 and the two end parts 2 and 2¹ consisting of suitable T irons. At the ends of the webs 2, 2¹ are mounted the members 3, 3¹ which have a beak, volute or like shape, and are secured by suitable means. The central part 1 and the end parts 2, 2¹ are cut at the point of junction as shown at 1¹ in Fig. 11, at each end of the central part 1, and as shown at 2¹ at the inner ends of the webs 2, 2¹. Retaining means, analogous to what has been above described, are provided in order to secure the webs 2, 2¹ in the interior of the gussets 7, 7¹, consisting of projections, suitably inserted, which are disposed in apertures in one of the flanges of the gussets.

It will be noted that the cut-out portions 2² formed in the movable portions 2, 2¹ are so disposed as to allow the rotation of their respective pivoting portions. Due to the form which is given to the said pivoting portions and their particular arrangement, I am enabled to construct a shock-absorbing bar whose outer ends are movable and wherein the necessary joints have a close adjustment whereby there will be no empty spaces at these points to offer prejudice to the proper appearance and outline of the apparatus.

Claims:

1. In a shock-absorbing bar device for vehicles in which the end portions of the bar are pivoted upon the central portion, an arrangement for mounting the pivoting ends of the bar, wherein suitable gussets are provided on the central portion of the bar, each of which carries the respective pivot axle for the end portion of the said bar, which is normally disposed within the respective gusset and rests upon its inner face, and means for retaining the bar within the gusset, consisting of a projection upon the bar adapted to engage an aperture in the gusset, said gusset being sufficiently elastic to permit said projection to slide over the inner face of the gusset to engage and disengage said aperture.

2. A pivoting support for the said bar as claimed in claim 1, comprising a shell which is secured to the said bar and is engaged with a sleeve whose wall is suitably slotted, in such manner that the angular position of the said shell may be regulated within the sleeve which is secured to the member serving to attach the device to the vehicle frame, the shell being held upon the said sleeve by means of laterally toothed disks which are pressed upon the respective faces of the shell and the sleeve by a bolt and nut.

3. A pivoting support for the bar claimed in claim 1 comprising a shell secured to said bar, a sleeve cooperating with the shell and provided with a slot, said shell having a bar support movable in the slot, members loosely mounted within the sleeve and shell and adapted to move therein, springs arranged between said members, screws mounted in one of said members and extending into said springs, and nuts on the screws for tensioning the springs.

4. A vehicle bumper including a fixed central portion, end portions pivotally connected to the central portion, abutments for limiting the swinging movement of the end portions in one direction, and automatic latching means for normally holding the end members relatively to said abutments.

5. A bumper for vehicles comprising a central portion, channel-shaped members fixed to the ends of said portion, end portions extending into the channel-shaped members, means pivotally connecting the end portions to the channel-shaped members, the bottom of each channel-shaped member functioning as an abutment to prevent the end portion with which it is associated from swinging beyond a certain point in one direction, and automatically operating locking means for normally holding the end portion at that point.

In testimony whereof I hereunto affix my signature.

MARCEL CHARLES ERNEST MULOT.